H. M. NAUGLE.

METAL LATH ATTACHING CLIP.

APPLICATION FILED MAY 17, 1921.

Reissued Mar. 7, 1922. 15,301.

2 SHEETS—SHEET 1.

Inventor

Harry M. Naugle

By: Crease, Merkel, Sayre & Bond

Attorneys

H. M. NAUGLE.

METAL LATH ATTACHING CLIP.

APPLICATION FILED MAY 17, 1921.

Reissued Mar. 7, 1922.

15,301

2 SHEETS—SHEET 2.

Inventor

Harry M. Naugle by Pruess, Merkel, Layne, Hall and Bond

Attorneys.

UNITED STATES PATENT OFFICE.

HARRY M. NAUGLE, OF CANTON, OHIO.

METAL-LATH-ATTACHING CLIP.

15,301. Specification of Reissued Letters Patent. Reissued Mar. 7, 192

Original No. 1,368,742, dated February 15, 1921, Serial No. 381,838, filed May 17, 1920. Application for reissue filed May 17, 1921. Serial No. 470,221.

*To all whom it may concern:*

Be it known that I, HARRY M. NAUGLE, a citizen of the United States, residing at Canton, Stark County, Ohio, have invented a new and useful Metal-Lath-Attaching Clip, of which the following is a specification.

This invention relates to improvements in metal lath attaching clips and more particularly to a spring clip designed for securing sheets of metal lath to steel joists.

The objects of the invention are the provision of a spring metal attaching clip which can be readily and easily applied to secure the metal lath to the joist without the aid of additional securing means, to provide an attaching clip of this character which will readily adjust itself to variations in the size and shape of the joist; and which will be cheap and inexpensive to manufacture and efficient in use.

The invention thus set forth in general terms is illustrated in the accompanying drawings forming part hereof, in which—

A practical embodiment of the invention is disclosed in the accompanying drawings, forming a part of this specification, in which similar numerals of reference indicate corresponding parts throughout the several views.

Figure 1:
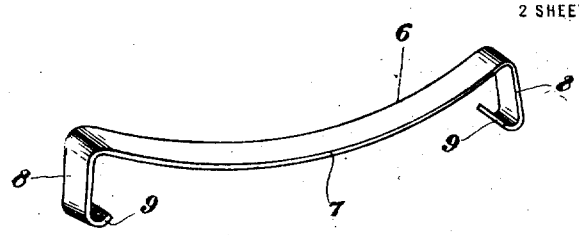
Figure 1 is a detail perspective view of one of the attaching clips.

The invention is especially adapted for use in connection with steel joists and for that purpose the application of the clip to a joist of this character, showing the means for connecting metal lath to the joists, is illustrated in the accompanying drawings.

The particular type of joist for which the clip is designed is formed of two channel members spot welded or otherwise connected together and comprises the web 1 and the upper and lower flanges 2 and 3, the outer edge of each flange being bent inwardly substantially parallel with the web, forming a short flange 4.

In forming the channel members from which the joist is formed, the metal strip from which each channel member is made may be accidentally placed at one side of the center, thus causing one of the flanges 4 to be slightly shorter than the other.

In order to form an attaching means which will readily adapt itself to these variations in the height of the flanges 4 the present attaching clip is designed, this clip being so constructed that it will automatically adapt itself to these variations in the construction of the joist, holding the metal lath tightly in engagement with the joist.

The metal lath shown at 5 may be of any usual and well known construction and is placed against the flat face of the upper or lower flange 2 or 3 respectively of the joist in the usual manner, the clip being placed in position upon the lath and extended therethrough and attached to the flanges of the joist.

The clip which is indicated generally by the numeral 6, is preferably formed of spring steel and may be formed of a flat strip, as shown, or of spring wire bent into the shape shown in the drawings. The clip comprises the arcuate body portion 7 extending the entire length of the clip and provided at its ends with the downwardly disposed legs 8 provided with inturned hooks 9 at their extremities. The normal relative position of the several portions of the clip is best illustrated in Fig. 1.

Although in the normal position of the clip, when detached, as shown in Fig. 1, the legs 8 diverge slightly away from the body portion 6 of the clip, the position of the legs with reference to each other is caused by the curvature of the body portion. Each leg of the clip is located at a little less than a right angle (80° to 85°) from a line tangent to the body portion of the clip at the junction of the leg and the body portion. With this construction it will be evident that when the body portion of the clip is flexed the legs will converge slightly, thus having a tendency to tightly hug the flanges 4 of the joist.

Figure 2:
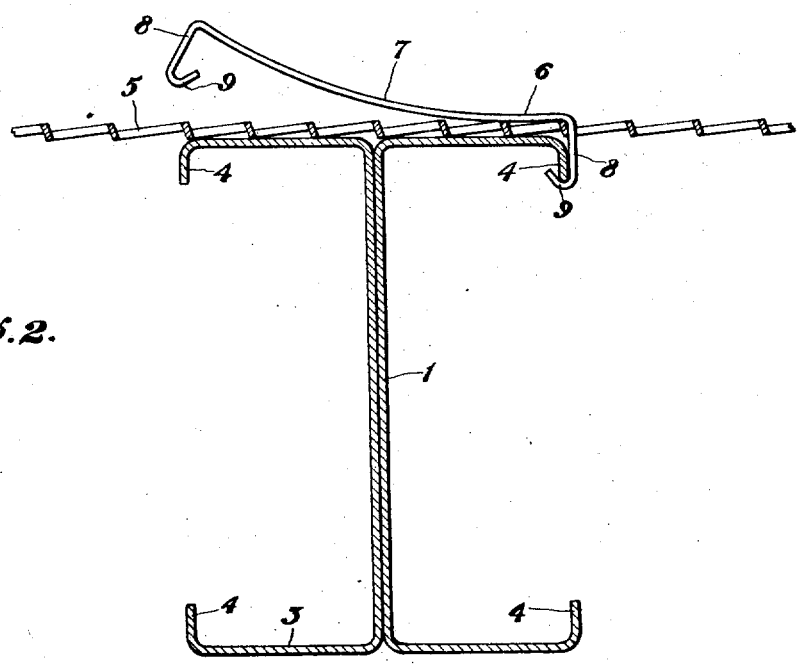
Fig. 2 is a sectional view through a steel joist and a portion of a sheet of metal lath showing one of the improved attaching clips partly in position upon the joist.

In attaching the metal lath to a joist by means of the attaching clip, the lath is first placed against the flat face of the flange of the joist to which it is to be attached, and one leg of the clip is inserted through an opening in the lath and the hook thereon engaged with the edge of the adjacent flange 4 of the joist, as shown in Fig. 2, the body portion of the clip thus extending away from the joist at an angle as shown in said figure. The other end of the clip is then pressed down, the leg thereon being inserted through the lath and the hook 9 thereon engaging the adjacent flange 4 of the joist.

Figure 3:
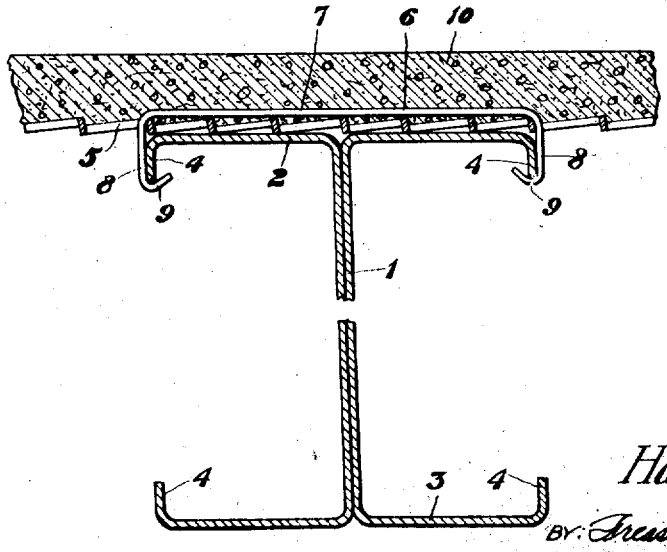
Fig. 3 is a sectional view through a joist and a portion of a sheet of metal lath showing the attaching clip in position thereon, securing the lath to the joist.

If the joist is of normal construction, that is, if both of the flanges 4 to which the clip is attached are of normal height, the clip will assume substantially the position shown in Fig. 3 of the drawings, the body portion 7 thereof being flexed into substantially a straight line engaging the metal lath across the entire width of the joist and holding the same firmly in contact with the flat face of the upper flange of the joist. The legs 8 of the clip will, owing to the construction above described, and due to the spring action of the clip, tightly hug the sides of the flanges 4, holding the hooks 9 firmly in position and preventing displacement thereof. Plaster 10 may then be applied in the usual manner, sealing the clip to the lath and joist and forming a permanent joint therebetween.

Figure 4:
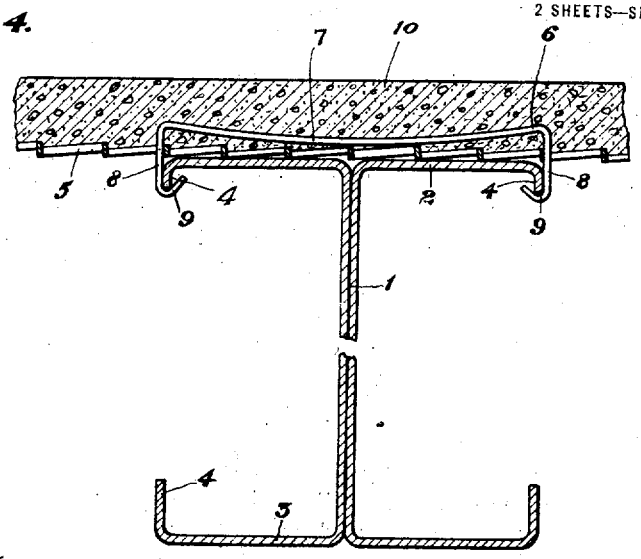
Fig. 4 is a similar view showing the position the clip assumes where the flanges of the joist are slightly narrower than normal.

Should both of the flanges 4, which are engaged by the clip, be of less than normal height, the clip will assume substantially the position illustrated in Fig. 4, the body portion thereof being slightly arcuate and engaging the metal lath at approximately the center of the joist, holding the lath tightly in engagement with the joist at this point, the spring in the body portion of the clip holding the hooks 9 tightly in engagement with the flange 4 of the joist.

Figure 5:
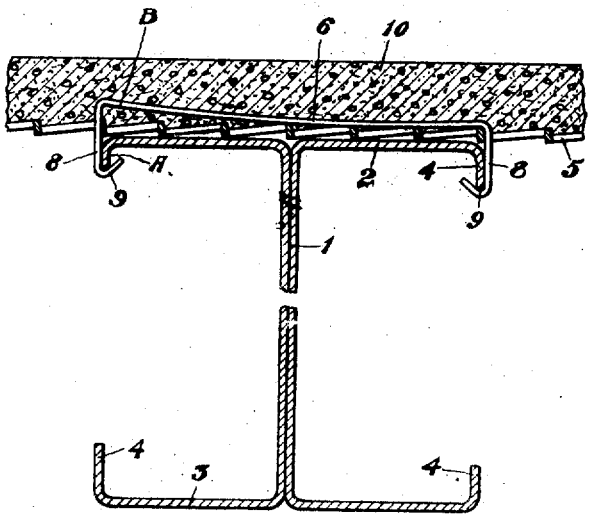
Fig. 5 is a similar view showing the position the clip assumes where one flange of the joist is shorter than the other.
Figure 6:
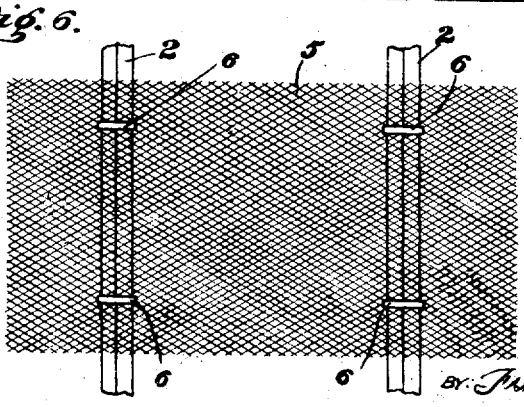
Fig. 6 is a plan view on a reduced scale of a portion of a sheet of metal lath showing portions of two joists and the attaching clips secured thereto.

Should one of the flanges 4 be of less height than the other, as indicated at "A" in Fig. 5, the clip will assume substantially the position illustrated in Fig. 5, the body portion of the clip engaging the lath for substantially half of the width of the joist and then extending slightly away from the lath at an angle, as shown at B in Fig. 5, the spring in the body portion of the clip causing the clip to be held in tight engagement with the lath for a portion of its length and causing the hooks 9 to tightly engage the flanges 4 of the joist, thus holding the metal lath firmly against the joist.

It will be evident from the foregoing that an attaching spring clip is provided which may be easily and readily applied to steel joists for the purpose of attaching metal lath thereto and which will firmly hold the lath in engagement with the joist under all ordinary or practical conditions, the clip automatically adapting itself to compensate for variations in the flanges of the joist, and the parts are preferably so proportioned and arranged that the length of the body portion is substantially equal to the width of the joist flange and with the relation of the parts when the body portion is deflected or flexed from its normal arcuate form to be substantially straight and parallel with the face of the joist flange, the legs will be sprung outward to be substantially perpendicular to the body portion so as to clamp the vertical flanges or edge portions of the joist, such being the preferable relation of the parts as shown in Fig. 3.

It will be understood that the use of the attaching clip set forth herein is not limited to fastening the metal lath to the steel joists employed for illustrating the invention; the only essentials being that the material to be fastened shall have openings through which the legs of the clip may be inserted, and that the support to which the material is fastened shall have means for engaging the hooks on the legs of the clip.

I claim:—

1. The combination of a joist having flanges presenting a flat face, expanded metal lath or the like abutting the flat face, and a spring metal clip comprising an arcuate body flattened by flexing against the lath, legs on the ends of the body inserted through openings in the lath, and hooks on the legs engaged with the flanges of the joist.

2. The combination of a joist having flanges presenting a flat face, expanded metal lath or the like abutting the flat face, and a spring metal clip comprising an arcuate body flattened by flexing against the lath, legs on the ends of the body inserted through openings in the lath, and hooks on the legs in springing engagement with the flanges of the joist.

3. A spring metal clip for fastening metal lath or the like to a flanged joist having a flat face, comprising an arcuate body with legs on the ends insertible through openings in the lath and having hooks for engaging the joist flanges when the body of the clip is flexed to flatten against the metal lath.

4. A spring metal attaching clip for fastening metal lath to a flanged joist, comprising an arcuate body portion of a length substantially the width of the joist, downwardly disposed legs at the extremities of the body portion insertible through openings in the metal lath, and inturned hooks at the extremities of the legs adapted to engage the flanges upon the joist, said body portion being adapted to be substantially flattened when it is flexed against the lath.

5. A spring metal clip for fastening metal lath or the like to a flanged joist having a flat face, comprising an arcuate body with legs on the ends insertible through openings in the lath, each leg located at an acute angle from a line tangent to the arcuate body portion at the junction of the leg and body, and hooks upon the legs for engaging the joist flanges when the body of the clip is flexed against the metal lath.

6. A spring metal clip for fastening metal lath or the like to a flanged joist having a flat face, comprising an arcuate body portion of a length substantially the width of the joist flange, legs on the ends of the body portion insertible through openings in the lath, each leg located at an acute angle from a line tangent to the arcuate body portion at the junction of the leg and body, and inturned hooks upon the legs for engaging the joist flange when the body of the clip is flexed against the metal lath.

7. A spring metal clip for fastening metal lath or the like to a support, comprising an arcuate body with legs on the ends insertible through openings in the lath, and having hooks for engaging the support when the body of the clip is flexed to flatten against the metal lath.

8. A spring metal attaching clip for fastening metal lath to a support, comprising an arcuate body portion of a length substantially the width of the support, downwardly disposed legs at the extremities of the body portion insertible through openings in the metal lath, and hooks at the extremities of the legs adapted to engage the support, said body portion being adapted to be substantially flattened when it is flexed against the lath.

9. A spring metal clip for fastening metal lath or the like to a support having a flat face, comprising an arcuate body with legs on the ends insertible through openings in the lath, each leg located at an acute angle from a line tangent to the arcuate body portion at the junction of the leg and body, and hooks upon the legs for engaging the support when the body of the clip is flexed against the metal lath.

10. A spring metal clip for fastening metal lath or the like to a support having a flat face, comprising an arcuate body portion of a length substantially the width of the support, legs on the ends of the body portion insertible through openings in the lath, each leg located at an acute angle from a line tangent to the arcuate body portion at the junction of the leg and body, and hooks upon the legs for engaging the support when the body of the clip is flexed against the metal lath.

11. A spring metal clip for fastening metal lath or the like to a support, comprising an arcuate body with legs on the ends insertible through openings in the lath, and having hooks for engaging the support when the body of the clip is flexed by pressure of an intermediate portion thereof against the lath.

12. A spring metal clip for fastening metal lath or the like to a support, comprising an arcuate body with legs on the ends insertible through openings in the lath, and having means for engaging the support when the body of the clip is flexed by pressure of an intermediate portion thereof against the lath.

13. A spring metal clip for fastening metal lath or the like to a support, comprising a resilient body with legs on the ends insertible through openings in the lath and having spring hooks for engaging the support when the body of the clip is flexed by pressure of an intermediate portion thereof against the lath.

14. A spring metal clip for fastening metal lath or the like to a support, comprising a resilient body with legs on the ends insertible through openings in the lath, and having spring means for engaging the support when the body of the clip is flexed by pressure of an intermediate portion thereof against the lath.

HARRY M. NAUGLE.